(12) United States Patent
McKittrick et al.

(10) Patent No.: US 12,079,046 B2
(45) Date of Patent: Sep. 3, 2024

(54) BONDED HINGE STRUCTURE FOR AN INFORMATION HANDLING SYSTEM

(71) Applicant: Dell Products L.P., Round Rock, TX (US)

(72) Inventors: Allen B. McKittrick, Cedar Park, TX (US); Anthony J. Sanchez, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 17/589,300

(22) Filed: Jan. 31, 2022

(65) Prior Publication Data

US 2023/0244281 A1    Aug. 3, 2023

(51) Int. Cl.
*G06F 1/16* (2006.01)

(52) U.S. Cl.
CPC ...... *G06F 1/1681* (2013.01); *E05Y 2900/606* (2013.01)

(58) Field of Classification Search
CPC .................................................... G06F 1/1681
See application file for complete search history.

(56) References Cited

U.S. PATENT DOCUMENTS

| | | | | |
|---|---|---|---|---|
| 7,746,631 | B2 * | 6/2010 | Ali | G06F 1/203 |
| | | | | 361/679.52 |
| 10,488,898 | B2 * | 11/2019 | Shah | G06F 1/206 |
| 10,579,113 | B2 * | 3/2020 | North | G06F 1/206 |
| 10,599,188 | B1 * | 3/2020 | McKittrick | G06F 1/1681 |
| 10,732,679 | B2 | 8/2020 | Wu et al. | |
| 11,406,044 | B2 * | 8/2022 | Wu | G09F 9/301 |
| 11,416,040 | B1 * | 8/2022 | Cavallaro | H05K 7/20963 |
| 2010/0053885 | A1 * | 3/2010 | Ali | G06F 1/1681 |
| | | | | 361/679.54 |
| 2017/0300089 | A1 * | 10/2017 | Hampton | G06F 1/1683 |
| 2018/0284856 | A1 * | 10/2018 | Shah | G06F 1/1616 |
| 2019/0286196 | A1 | 9/2019 | Sanchez et al. | |
| 2019/0317572 | A1 * | 10/2019 | North | G06F 1/203 |

* cited by examiner

*Primary Examiner* — Anthony M Haughton
*Assistant Examiner* — Theron S Milliser
(74) *Attorney, Agent, or Firm* — Larson Newman, LLP (57) ABSTRACT

An information handling system includes a cover and a bonded hinge assembly bonded to the cover. The bonded hinge assembly includes a support frame and a hinge. The support frame has a low airflow impedance. The hinge is bonded to the support frame. The hinge is integrated within the support frame when the hinge is bonded to the support frame.

20 Claims, 7 Drawing Sheets

BONDED HINGE STRUCTURE FOR AN INFORMATION HANDLING SYSTEM

FIELD OF THE DISCLOSURE

The present disclosure generally relates to information handling systems, and more particularly relates to a bonded hinge structure for an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a cover and a bonded hinge assembly bonded to the cover. The bonded hinge assembly includes a support frame and a hinge. The support frame has a low airflow impedance. The hinge is bonded to the support frame. The hinge is integrated within the support frame when the hinge is bonded to the support frame.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
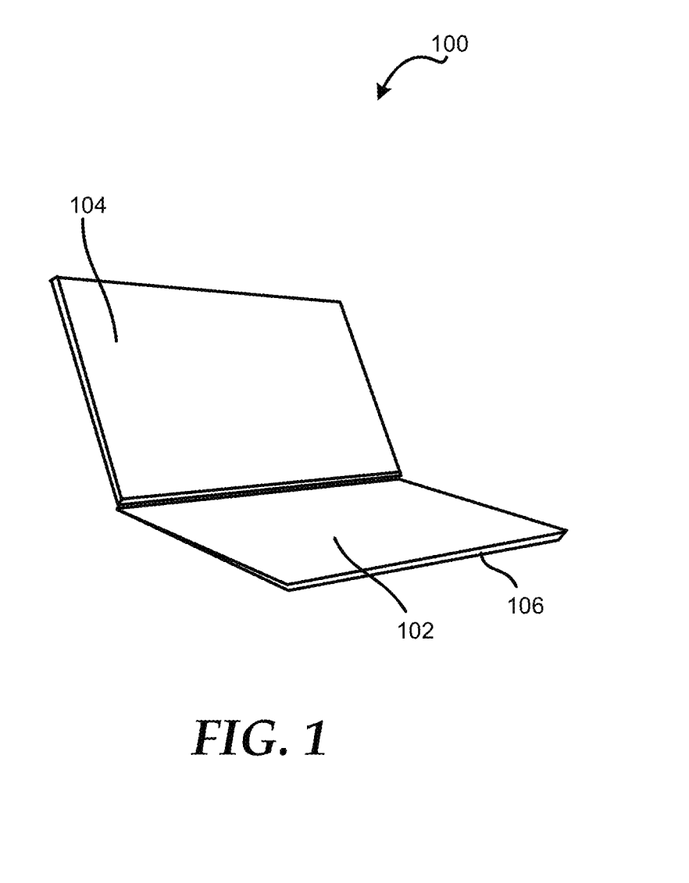
FIG. 1 is a perspective view of an information handling system according to at least one embodiment of the disclosure.

FIG. 1 illustrates an information handling system 100 according to at least one embodiment of the disclosure. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 100 includes a base 102 and a display device 104. Base 102 includes a cover 106, which in turn may surround one or more components of information handling system 100. In an example, the components of information handling system 100 may be any suitable components, such as the components described for information handling system 700 in FIG. 7. During operation, the components may generate heat that is expelled out of the back of base 102. In certain examples, the temperature of the skin of cover 106 may increase if not enough hot air is removed from information handling system 100. In previous information handling systems, the hinge assemblies connecting base 102 to display device 104 may block exhaust ports of information handling system 100, which in turn may reduce the amount of hot air expelled from the information handling system. In an example, a bonded hinge assembly may reduce an amount of the exhaust ports blocked as compared hinge assemblies in previous information handling systems.

Figure 2:
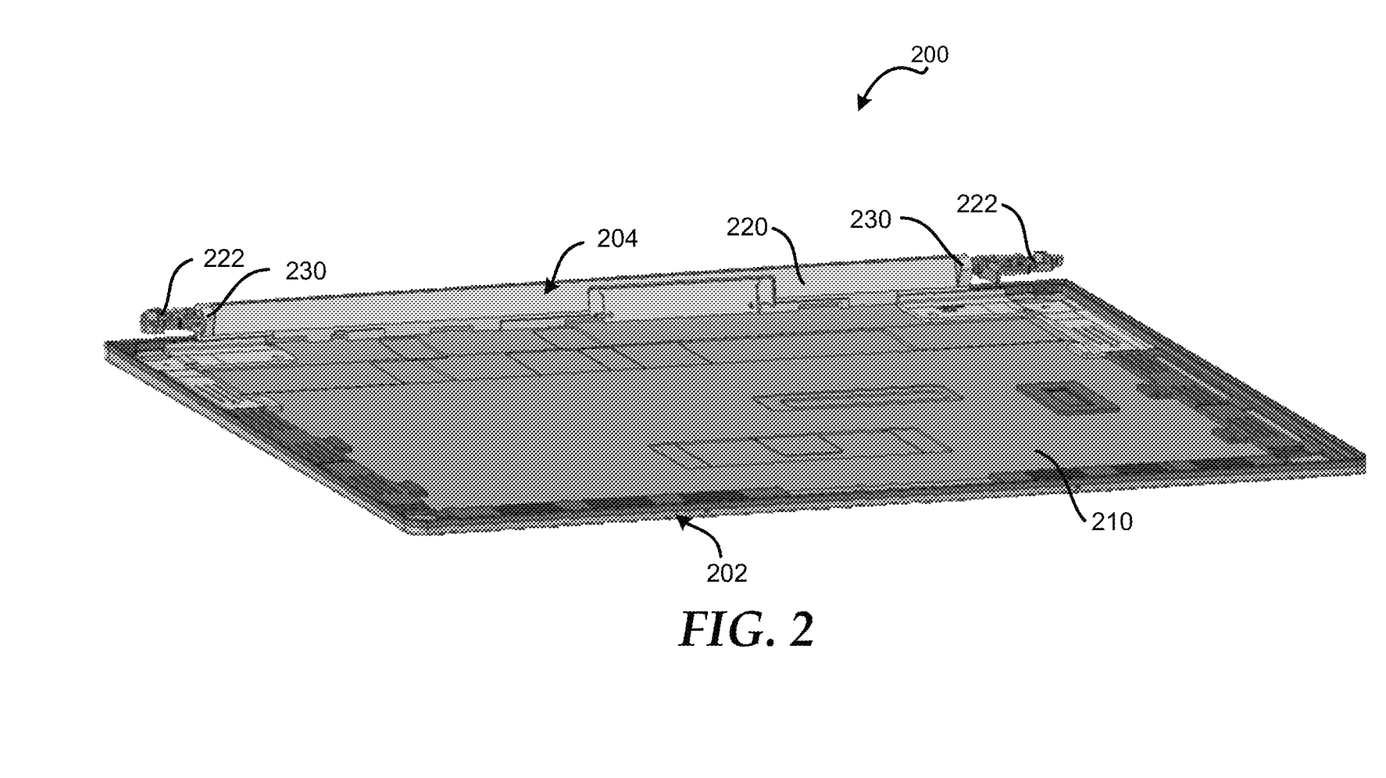
FIG. 2 is a perspective view of the bonded hinge assembly connected to a base of an information handling system according to at least one embodiment of the present disclosure.
Figure 3:
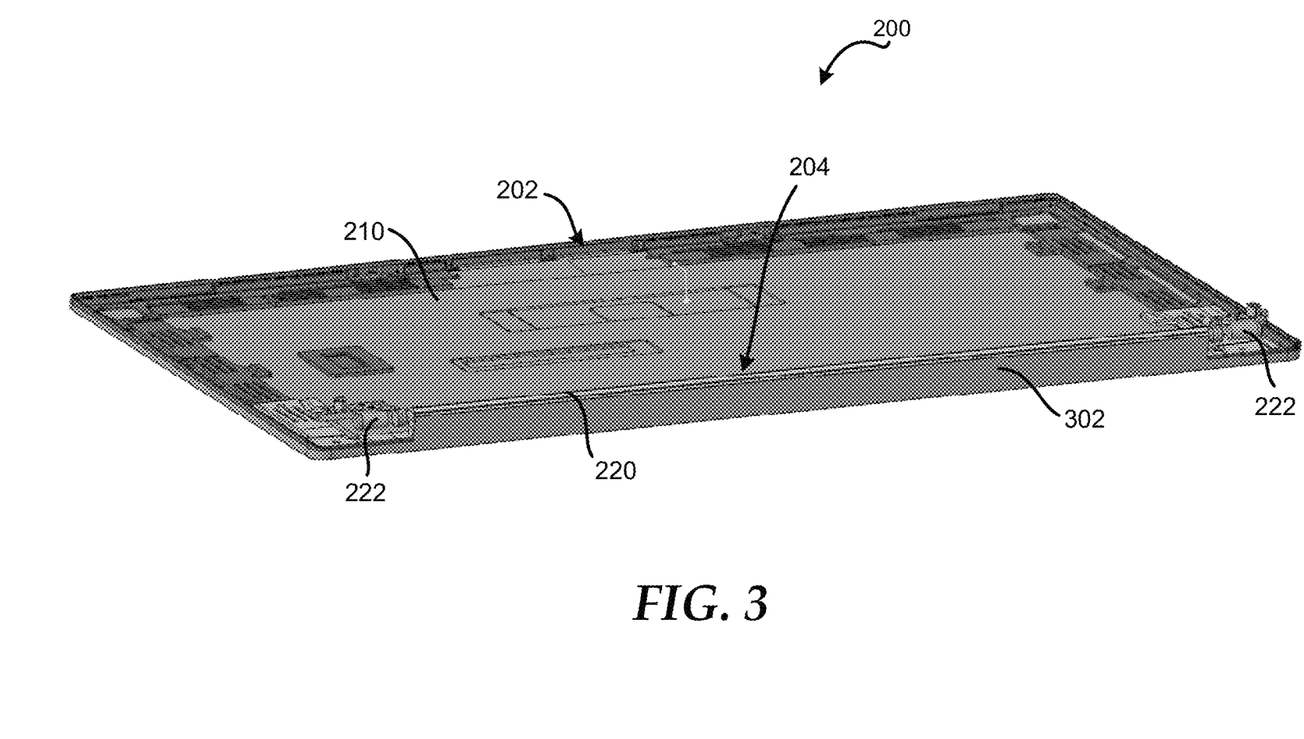
FIG. 3 is a perspective view of the bonded hinge assembly connected to the base of an information handling system according to at least one embodiment of the present disclosure.

FIGS. 2 and 3 illustrate a portion of information handling system 200 including a base 202 and a bonded hinge assembly 204 according to at least one embodiment of the present disclosure. Base 202 includes a cover 210. Bonded hinge assembly 204 includes a support frame 220, hinges 222, and hinge rotation portion covers 230. In an example cover 210 may be any suitable type of cover, such as a stamped cover of uniform thickness. In certain examples, cover 210 may be any suitable material including, but not limited to, aluminum. For example, cover 210 may be a stamped A-cover with a uniform thickness.

In an example, cover 210 of base 202 may be formed in any suitable manner, such as being stamped by a computerized numerical control (CNC) machine. Cover 210 may be stamped CNC or CNCS unibody housing for base 202. The CNCS cover 210 may have a constant thin wall or skin thickness, which in turn may limit the ability of information handling system to pass wobble and overbend test requirements. In an example, the wobble and overbend test may be a test designed of how a base reacts or handles forces exerted on the base when a force is exerted on a display device, such as display device 104 in FIG. 1, to open information handling system 100 or 200. For example, the test may mimic the force when the display device 104 is pushed to a stop point and beyond by a user. Hinge rotation portion covers 230 of bonded hinge assembly 204 may reduce a hot air exhaust impedance within information handling system 200. In an example, the reduced hot air impedance of bonded hinge assembly 204 may improve the thermal performance of information handling system 200 by allowing more hot air to be expelled from the information handling system as compared to previous information handling systems.

Referring to FIG. 3, cover 210 of base 202 may be bonded to bonded hinge assembly 204 at one or more suitable locations. In an example, bonded hinge assembly 204 may be bonded to cover 210 at one or more points of contact between the bonded hinge assembly, at all points of contact between the bonded hinge assembly and the cover, or the like. Cover 210 includes a back wall 302. In an example, back wall 302 may created in cover 210 via the stamped CNC operation to form the cover of base 202. Bonded hinge assembly 204 may be bonded to back wall 302 and any other point of contact between the bonded hinge assembly and cover 210.

In an example, bonded hinge assembly 204 may be bonded to cover 210 via any suitable metal bonding technique including, but not limited to, adhesives. For example, adhesives may be utilized to bond thin cover 210 to the thin bonded hinge assembly 204. The adhesive metal bonding may result in cover 210 having high strength and rigidity as compared to the strength and rigidity of the cover alone. The increased strength and rigidity may enable information handling system 200 to pass an overbending and wobble test for the information handling system. In an example, the metal bonding adhesives may eliminate bulges, gaps, protruding fasteners, or the like within information handling system 200, which may reduce the hot air impedance of bonded hinge assembly 204.

Figure 4:
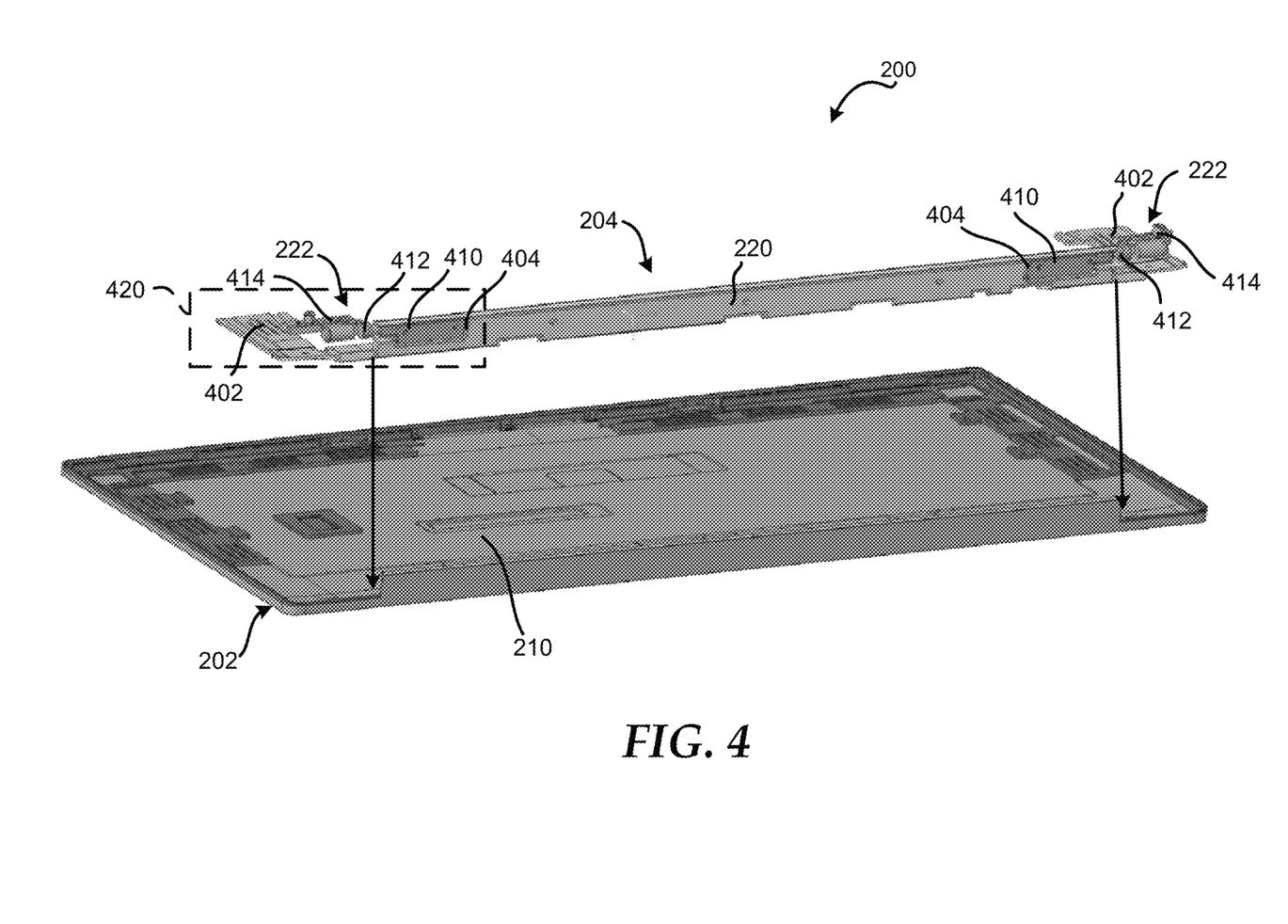
FIG. 4 is a perspective view of the bonded hinge assembly separate from the base of an information handling system according to at least one embodiment of the present disclosure.

FIG. 4 illustrates base 202 separate from bonded hinge assembly 204 of information handling system 200 according to at least one embodiment of the present disclosure. Bonded hinge assembly 204 includes extensions 402 and support frame 220, which in turn includes notches 404. Each hinge 222 includes an attachment portion 410, a rotation portion 412, and a connector 414. Attachment portion 410 of hinge 222 may be substantially the same size and shape as notch 404 of support frame 220.

In certain examples, extensions 402 may be bonded to cover 210 of base 202 as will be described with respect to FIG. 6 below. In an example, attachment portion 410 may be bonded within notch 404 of support frame 220 to hold hinge 222 in physical communication with the support frame. In certain examples, attachment portion 410 may be bonded with support frame 220 along the entire contact surface between the attachment portion and notch 404. Attachment portion 410 may be fixed in location and position with respect to support frame 220. In this example, the attachment portion 410 does not move with respect to support frame 410. A detail illustration of portion 420 of bonded hinge assembly 204 will be described with respect to FIG. 5.

Figure 5:
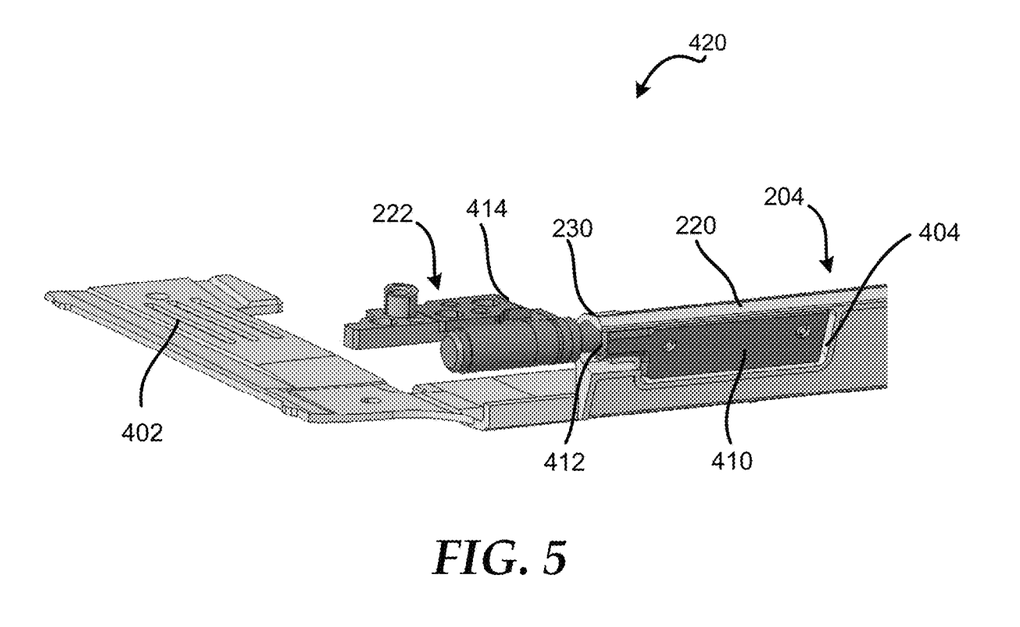
FIG. 5 is a perspective view of the bonded hinge assembly and a portion of a support frame of the information handling system according to at least one embodiment of the present disclosure.

FIG. 5 illustrates portion 420 bonded hinge assembly 204 according to at least one embodiment of the present disclosure. As shown in FIG. 5, attachment portion 410 and rotation portion 412 of hinge 222 may be located within notch 404. In an example, rotation portion 412 may be the section of hinge 222 where connector 414 is inserted within attachment portion 410. Connector 414 may be placed in physical communication with a display device, such as display device 104 of FIG. 1. In this example, connector 414 may be fixed in location and position with respect to the display device, such that the connector does not move with respect to the display device. In certain examples, rotation portion 412 may enable connector 414 to rotate with respect to attachment portion 410, such that a display device may rotate with respect to a base.

As shown in FIG. 5, rotation portion cover 230 may be located over rotation portion 412. In an example, rotation portion cover 230 of bonded hinge assembly 204 may be substantially smaller than a cover of a hinge assembly in a previous information handling system. In certain examples, the covers of hinge assemblies may be the component of the hinge assembly that produces or affects the hot air impedance of the hinge assembly. As a result of rotation portion cover 230 being substantially smaller than corresponding covers in previous hinge assemblies, the hot air impedance of bonded hinge assembly 204 may be substantially less than the hot air impedance of hinge assemblies in previous information handling systems. For example, a reduction of hot air impedance in hinge assembly 204 may be any suitable amount from previous information handling systems, such as eighty percent reduction, eighty-two percentage reduction, eighty-four percentage reduction, eight-six percent reduction, or the like. The reduction in hot air impedance within bonded hinge assembly 204 may provide greater airflow in the hot air exhaust ports or region of an information handling system, which in turn may lower skin temperatures of the cover of the information handling system, such as cover 210 of information handling system 200 in FIG. 2.

Figure 6:
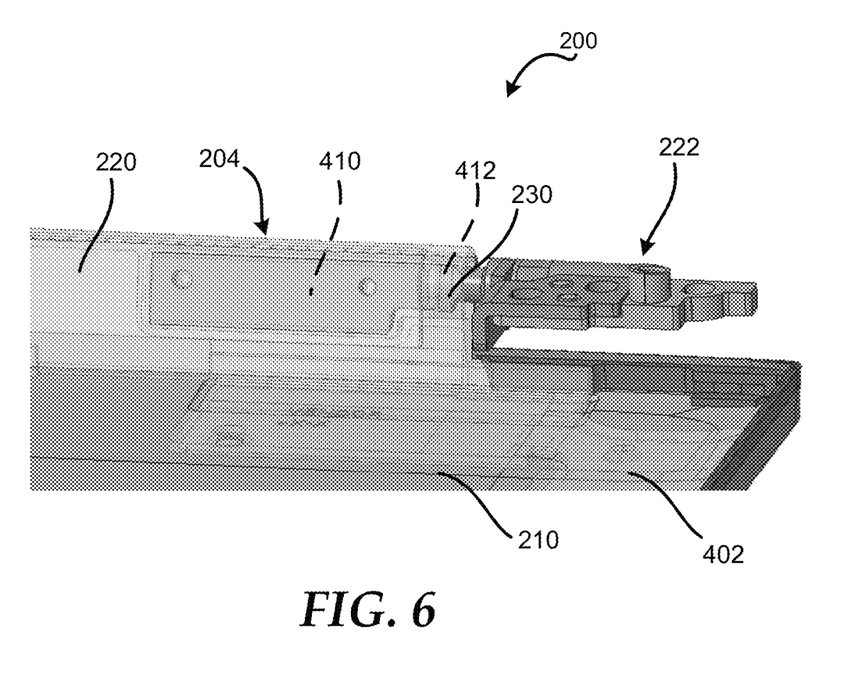
FIG. 6 is a perspective view of the bonded hinge assembly and a portion of the base of the information handling system according to at least one embodiment of the present disclosure.

FIG. 6 illustrate a portion of information handling system 200 including a portion of base 202 and a portion of bonded hinge assembly 204 according to at least one embodiment of the present disclosure. As shown in FIG. 6, attachment portion 410 and rotation portion 412 are located within support frame 220. In an example, rotation cover 230 of support frame 220 may be located over rotation portion 412 of hinge 222.

In certain examples, extension portion 402 may be bonded to cover 210 of base 202. Extension portion 402 may be bonded to cover 210 along the entire contact surface between the extension portion and the cover, such that bonded hinge assembly may be bonded to cover 210 along the contact surface between the bonded hinge assembly and the cover. As stated above, the adhesive bonding of bonded hinge assembly 204 to base 202 may improve the structural strength and rigidity of the information handling system.

Figure 7:
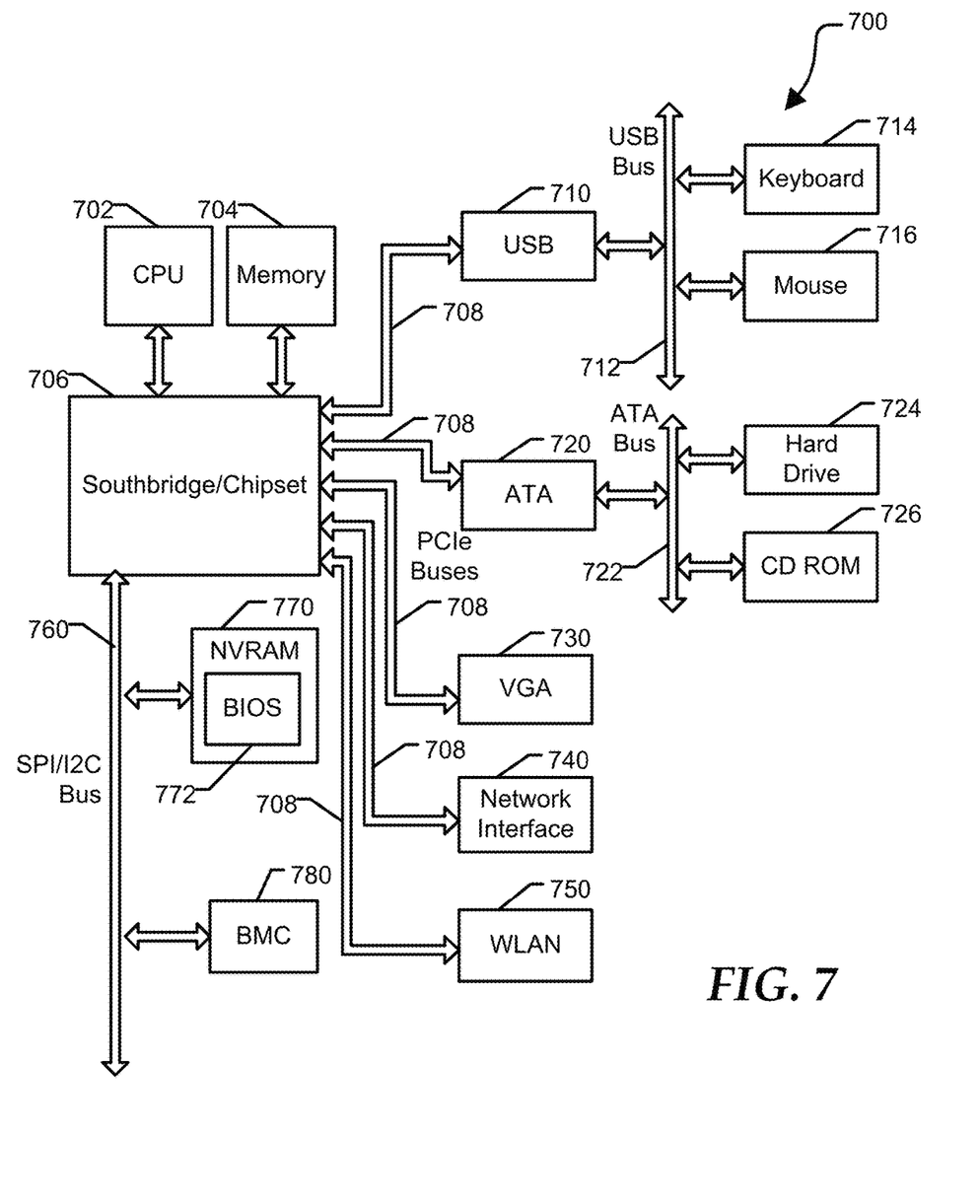
FIG. 7 is a block diagram of an information handling system according to an embodiment of the present disclosure.

FIG. 7 illustrates an information handling system 700 including a processor 702, a memory 704, a chipset 706, a PCI bus 708, a universal serial bus (USB) controller 710, a USB 712, a keyboard device controller 714, a mouse device controller 716, a configuration database 718, an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a flash memory device 770 for storing BIOS code 772, a trusted platform module (TPM) 780, and a baseboard management controller (EC) 790. EC 790 can be referred to as a service processor, and embedded controller, and the like. Flash memory device 770 can be referred to as a SPI flash device, BIOS non-volatile random access memory (NVRAM), and the like. EC 790 is configured to provide out-of-band access to devices at information handling system 700. As used herein, out-of-band access herein refers to operations performed without support of CPU 702, such as prior to execution of BIOS code 772 by processor 702 to initialize operation of system 700. In an embodiment, system 700 can further include a platform security processor (PSP) 774 and/or a management engine (ME) 776. In particular, an x86 processor provided by AMD can include PSP 774, while ME 776 is typically associated with systems based on Intel x86 processors.

PSP 774 and ME 776 are processors that can operate independently of core processors at CPU 702, and that can execute firmware prior to the execution of the BIOS by a primary CPU core processor. PSP 774, included in recent AMD-based systems, is a microcontroller that includes dedicated read-only memory (ROM) and static random access memory (SRAM). PSP 774 is an isolated processor that runs independently from the main CPU processor cores. PSP 774 has access to firmware stored at flash memory device 770. During the earliest stages of initialization of system 700, PSP 774 is configured to authenticate the first block of BIOS code stored at flash memory device 770 before releasing the x86 processor from reset. Accordingly, PSP 774 provides a hardware root of trust for system 700. ME 776 provides similar functionality in Intel-based systems. In another embodiment, EC 790 can provide aspects of a hardware root of trust. The root of trust relates to software processes and/or hardware devices that ensure that firmware and other software necessary for operation of an information handling system is operating as expected.

Information handling system 700 can include additional components and additional busses, not shown for clarity. For example, system 700 can include multiple processor cores, audio devices, and the like. While a particular arrangement of bus technologies and interconnections is illustrated for the purpose of example, one of skill will appreciate that the techniques disclosed herein are applicable to other system architectures. System 700 can include multiple CPUs and redundant bus controllers. One ore more components can be integrated together. For example, portions of chipset 706 can be integrated within CPU 702. In an embodiment, chipset 706 can include a platform controller hub (PCH). System 700 can include additional buses and bus protocols, for example I2C and the like. Additional components of information handling system 700 can include one or more storage devices that can store machine-executable code, one or more communications ports for communicating with external devices, and various input and output (I/O) devices, such as a keyboard, a mouse, and a video display.

For purposes of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as CPU 702, a programmable logic array (PLA), an embedded device such as a System-on-a-Chip (SoC), or other control logic hardware. Information handling system 700 can also include one or more computer-readable medium for storing machine-executable code, such as software or data.

BIOS code 772 can be referred to as a firmware image, and the term BIOS is herein used interchangeably with the term firmware image, or simply firmware. In an embodiment, BIOS 772 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 700. While the techniques disclosed herein are described in the context of a UEFI compliant system, one of skill will appreciate that aspects of the disclosed systems and methods can be implemented at substantially any information handling system having configurable firmware.

BIOS code 772 includes instructions executable by CPU 702 to initialize and test the hardware components of system 700, and to load a boot loader or an operating system (OS) from a mass storage device. BIOS code 772 additionally provides an abstraction layer for the hardware, i.e. a consistent way for application programs and operating systems to interact with the keyboard, display, and other input/output devices. When power is first applied to information handling system 700, the system begins a sequence of initialization procedures. During the initialization sequence, also referred to as a boot sequence, components of system 700 are configured and enabled for operation, and device drivers can be installed. Device drivers provide an interface through which other components of the system 700 can communicate with a corresponding device.

The storage capacity of SPI flash device 770 is typically limited to 32 MB or 64 MB of data. However, original equipment manufacturers (OEMs) of information handling systems may desire to provide advanced firmware capabilities, resulting in a BIOS image that is too large to fit in SPI flash device 770. Information handling system can include other non-volatile flash memory devices, in addition to SPI flash device 770. For example, memory 704 can include non-volatile memory devices in addition to dynamic random access memory devices. Such memory is referred to herein as non-volatile dual in-line memory module (NVDIMM) devices. In addition, hard drive 724 can include non-volatile storage elements, referred to as a solid state drive (SSD). For still another example, information handling system 700 can include one or more non-volatile memory express (NVMe) devices. Techniques disclosed herein provide for storing a portion of a BIOS image at one or more non-volatile memory devices in addition to SPI flash device 770.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a cover; and
   a bonded hinge assembly bonded to the cover, wherein the bonded hinge assembly includes:
   a support frame with a low airflow impedance, the support frame including a notch; and
   a hinge including an attachment portion, a rotation portion, and a connector, the attachment portion bonded within the notch of the support frame, wherein the hinge is integrated within the support frame when the hinge is bonded to the support frame, wherein the connector is inserted within the attachment portion, wherein the rotation portion enables the connector to rotate with respect to the attachment portion.

2. The information handling system of claim 1, further comprising:
   a display device connected to the cover through the bonded hinge assembly.

3. The information handling system of claim 2, wherein the support frame of the bonded hinge assembly prevents an over bend of the cover when a force is exerted on the display device to open the information handling system.

4. The information handling system of claim 1, wherein the support structure and the hinge are bonded via adhesives along an entire contact surface between the support structure and the hinge.

5. The information handling system of claim 1, wherein the low airflow impedance enables a high amount of exhaust airflow to leave the information handling system.

6. The information handling system of claim 1, wherein the low airflow impedance causes a low temperature of a skin of the cover.

7. The information handling system of claim 1, wherein the cover is a thinly stamped cover.

8. The information handling system of claim 7, wherein the cover has a uniform thickness.

9. An information handling system comprising:
   a base including one or more components of the information handling system, the base including a cover around the components; and
   a bonded hinge assembly bonded to the cover, wherein the bonded hinge assembly includes:
   a support frame with a low airflow impedance, the support frame including a notch; and
   a hinge including an attachment portion, a rotation portion, and a connector, the attachment portion bonded within the notch of the support frame, wherein the hinge is integrated within the support frame when the hinge is bonded to the support frame, wherein the connector is inserted within the attachment portion, wherein the rotation portion enables the connector to rotate with respect to the attachment portion.

10. The information handling system of claim 9, further comprising:
    a display device connected to the cover through the bonded hinge assembly.

11. The information handling system of claim 10, wherein the support frame of the bonded hinge assembly prevents an over bend of the cover when a force is exerted on the display device to open the information handling system.

12. The information handling system of claim 9, wherein the support structure and the hinge are bonded via adhesives along an entire contact surface between the support structure and the hinge.

13. The information handling system of claim 9, wherein the low airflow impedance enables a high amount of exhaust airflow to leave the information handling system.

14. The information handling system of claim 9, wherein the low airflow impedance causes a low temperature of a skin of the cover.

15. The information handling system of claim 9, wherein the cover is a thinly stamped cover.

16. The information handling system of claim 15, wherein the cover has a uniform thickness.

17. An information handling system comprising:
    a base including one or more components of the information handling system, the base including a cover around the components, wherein the cover is a thinly stamped cover with a uniform thickness; and
    a bonded hinge assembly bonded to the cover, wherein the bonded hinge assembly includes a support frame with a low airflow impedance to enable a high amount of exhaust airflow to leave the information handling system, the support frame including a notch, and a hinge including an attachment portion, a rotation portion, and a connector, the attachment portion bonded within the notch of the support frame, the hinge being integrated within the support frame when the hinge is bonded to the support frame, wherein the connector is inserted within the attachment portion, wherein the rotation portion enables the connector to rotate with respect to the attachment portion.

18. The information handling system of claim 17, further comprising a display device connected to the cover through the bonded hinge assembly.

19. The information handling system of claim 18, wherein the support frame of the bonded hinge assembly prevents an over bend of the cover when a force is exerted on the display device to open the information handling system.

20. The information handling system of claim 17, wherein the support structure and the hinge are bonded via adhesives along an entire contact surface between the support structure and the hinge.

* * * * *